No. 830,014. PATENTED SEPT. 4, 1906.
J. H. SHAW & A. A. PAGE.
LOCK.
APPLICATION FILED JULY 21, 1905.
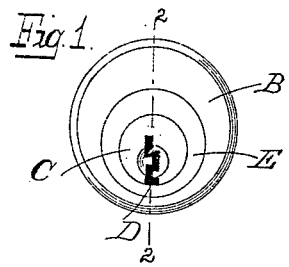
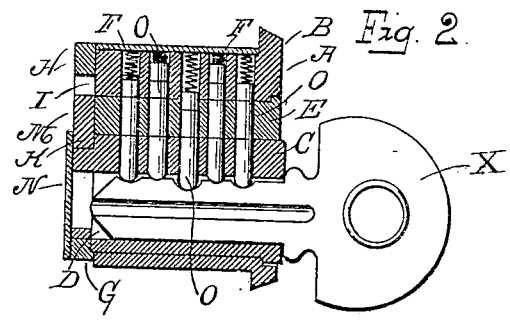
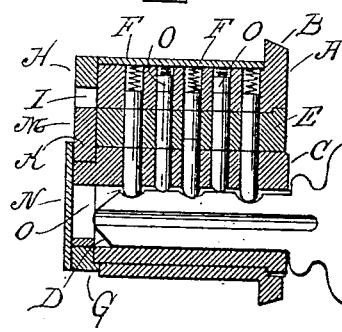
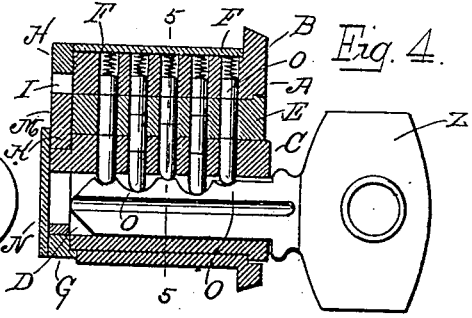
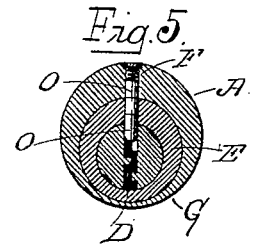
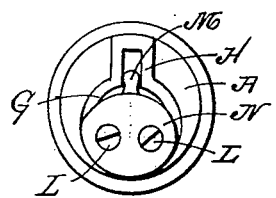
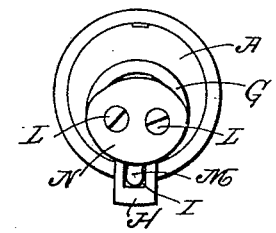
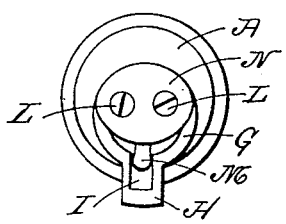
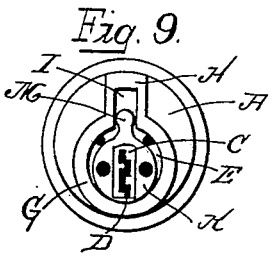
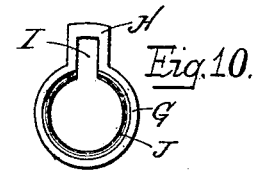
Witnesses
J. S. Coleman
S. E. Cooper
Inventors
John H. Shaw
Albert A. Page
by Beach & Fisher
Attorneys

UNITED STATES PATENT OFFICE.

JOHN H. SHAW, OF NEW HAVEN, AND ALBERT A. PAGE, OF EAST HAVEN, CONNECTICUT, ASSIGNORS TO SARGENT & COMPANY, OF NEW HAVEN, CONNECTICUT, A CORPORATION OF CONNECTICUT.

LOCK.

No. 830,014. Specification of Letters Patent. Patented Sept. 4, 1906.

Application filed July 21, 1905. Serial No. 270,716.

*To all whom it may concern:*

Be it known that we, JOHN H. SHAW, of the city of New Haven, and ALBERT A. PAGE, of the town of East Haven, in the county of New Haven, State of Connecticut, have invented new and useful Improvements in Locks, of which the following is a full, clear, and exact description when taken in connection with the accompanying drawings, which form a part thereof, and in which—

Figure 1 represents a front elevation of a lock embodying my invention; Figs. 2, 3, and 4, longitudinal vertical sections on lines 2 2 of Fig. 1, showing the operation of the lock when different keys are inserted; Fig. 5, a transverse vertical section on lines 5 5 of Fig. 4; Figs. 6, 7, and 8, rear views of the lock with the dog and operating mechanism shown in different positions; Fig. 9, a similar view with the washer removed, and Fig. 10 a front detail view of the dog alone.

In all figures similar letters of reference represent like parts.

This invention relates to locks, and more particularly to that class of locks known as "escutcheon cylinder-locks," having a key hub or barrel adapted to be rotated by a key inserted longitudinally into the barrel.

The present invention is an improvement in the form of escutcheon cylinder-locks set forth and described in an application of John H. Shaw, filed on the 21st day of July, 1905, and having the Serial No. 270,691, in which application a lock is shown having a sleeve with an eccentric bore for the rotary hub or barrel, with suitable tumbler mechanism by which the hub or barrel may be rotated independently of the sleeve or both together.

The present invention has for its object the production of a novel and efficient form of operating-dog for use in such a lock.

To this end the invention consists of a dog loosely mounted on the sleeve and mechanism for operating the dog from the rotary hub or barrel, so that the dog is free to rotate independently of the sleeve, with the hub or barrel alone, or with the sleeve when the hub or barrel is rotated therewith, while the center of rotation of the dog is always the axis of the sleeve.

The invention therefore consists of the improvements and combinations of parts set forth and claimed hereinafter.

Referring to the drawings for a more particular understanding of the invention, the parts designated by the letter A represent the body or cylinder of the lock, and B its face.

C designates the barrel or hub, having a longitudinal slot D for the reception of the key. A sleeve E is loosely mounted within the cylinder or casing and has an eccentric bore for the barrel C, its center being above that of the barrel. Radial tumbler-pockets F are provided in the cylinder A and sleeve C for the tumbler-pins and springs, as more fully set forth in the application above referred to.

A bolt-operating dog H is shown formed integral with a ring G, loosely mounted on the rear end of the sleeve E. The bolt-operating dog H is provided with a longitudinal slot I, and the ring G has at one side a flange J, adapted to abut against the rear end of the sleeve E.

A disk K on the rear of the hub or barrel C has an operating-stud M, adapted to extend into the longitudinal slot I in the bolt-operating dog H. A plate N is adapted to fit over the ring G and be secured to the hub or barrel C by screws L or other means passing through the disk K, thereby holding the ring G and disk in place.

A variety of keys, such as a room-key X, a master key Y, and a grand master-key Z, may be used in connection with this lock. One of these, such as X, Fig. 2, will operate the tumblers O, so that the barrel or hub C may be rotated independently of the sleeve E, while the sleeve E is held against rotation in the cylinder. The other two keys Y, Fig. 3, and Z, Fig. 4, will operate the tumblers O so that the barrel C and sleeve E will be rotated within the cylinder A, although each places the tumblers in a somewhat different position.

The operation of the bolt-operating dog is as follows: When the barrel C is rotated independently of the sleeve E, the stud M on the disk K will rotate the ring G, carrying the bolt-operating dog H independently of the sleeve E. As the ring G rotates on the axis of the sleeve E, which is above that of the hub or barrel C, and as the disk K rotates on the axis of the barrel C when these parts have described a semirevolution, the stud M will move outward in the slot I of the bolt-operating dog H, occupying substantially the position shown in Fig. 7. When the barrel C and sleeve E are rotated together, the rotation is on the axis of the sleeve E, so that the ring G and bolt-operating dog H will rotate with the sleeve E, and there will be no longitudinal movement of the stud M in the slot I of the bolt-operating dog H, Fig. 8.

Having now described our invention, what we claim, and desire to secure by Letters Patent, is—

1. In a lock, the combination with a casing; of a rotary key barrel or hub; a sleeve loosely mounted in said casing to rotate therein and having an eccentric bore for said barrel or hub; a bolt-operating dog rotatable independently of said sleeve; mechanism operated by said barrel or hub for rotating said bolt-operating dog, and tumbler mechanism in said casing, sleeve and barrel or hub adapted to permit the rotation of said barrel or hub separately from said sleeve, substantially as described.

2. In a lock, the combination with a casing; of a rotary key barrel or hub; a sleeve loosely mounted in said casing to rotate therein and having an eccentric bore for said barrel or hub; a bolt-operating dog loosely mounted on said sleeve; mechanism having a sliding engagement with said bolt-operating dog and operated by said barrel or hub for rotating said bolt-operating dog, and tumbler mechanism for locking said sleeve and barrel or hub to rotate together or separately, substantially as described.

3. In a lock, the combination with a casing; of a rotary key barrel or hub; a sleeve loosely mounted in said casing to rotate therein and having an eccentric bore for said barrel or hub; a bolt-operating dog loosely mounted on said sleeve; mechanism operated by said barrel or hub for rotating said bolt-operating dog; and tumbler mechanism for locking said sleeve and barrel or hub to rotate together, substantially as described.

In witness whereof we have hereunto set our hands on the 19th day of June, 1905.

JOHN H. SHAW.
ALBERT A. PAGE.

Witnesses:
WILLIAM H. KIRSCHNER,
ALICE A. WILSON.